No. 782,599. PATENTED FEB. 14, 1905.
F. R. CORNWALL.
BRAKE BEAM.
APPLICATION FILED DEC. 5, 1904.
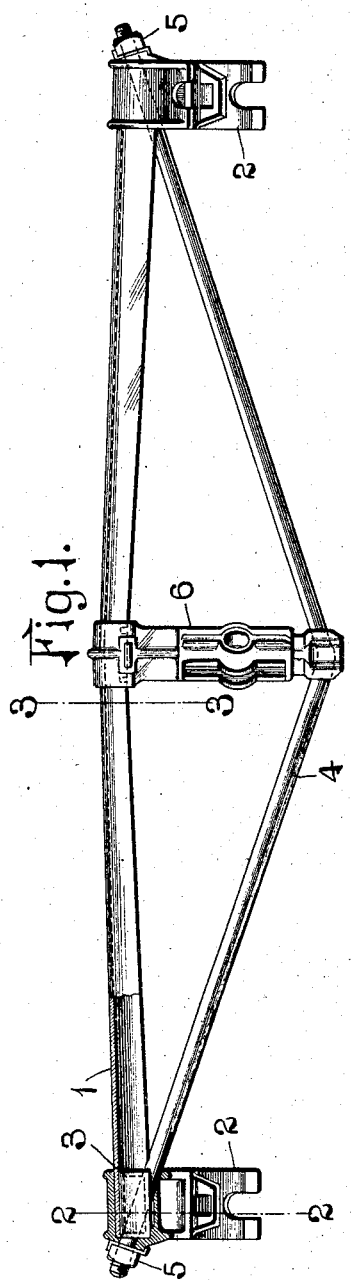
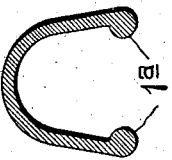
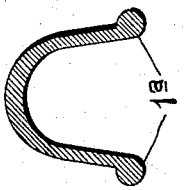
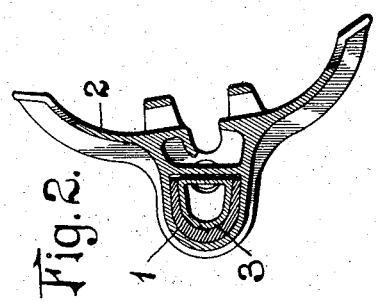
Witnesses
A. J. McCauley
G. A. Pennington
Inventor:-
Frederick R. Cornwall.
BY Bakewell & Cornwall
ATTY'S.

No. 782,599. Patented February 14, 1905.

UNITED STATES PATENT OFFICE.

FREDERICK R. CORNWALL, OF ST. LOUIS, MISSOURI, ASSIGNOR TO CHICAGO RAILWAY EQUIPMENT COMPANY, OF CHICAGO, ILLINOIS, A CORPORATION OF ILLINOIS.

BRAKE-BEAM.

SPECIFICATION forming part of Letters Patent No. 782,599, dated February 14, 1905.

Application filed December 5, 1904. Serial No. 235,544.

*To all whom it may concern:*

Be it known that I, FREDERICK R. CORNWALL, a citizen of the United States, residing in the city of St. Louis, State of Missouri, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a plan view of my improved brake-beam. Fig. 2 is a sectional view on the line 2 2 of Fig. 1. Fig. 3 is a sectional view on the line 3 3 of Fig. 1. Fig. 4 is an enlarged sectional view through the compression member, and Figs. 5 and 6 are similar views showing modified forms of the compression member.

This invention relates to a new and useful improvement in brake-beams of that type shown in patent granted to Charles F. Huntoon, No. 760,868, dated May 24, 1904, the object being to construct a brake-beam whose compression member is in the form of a channel having diverging legs or members whereby the bulging stresses to which this structure is subjected under load are counteracted by the strains tending to preserve its original shape. In the preferred form of my invention the compression member is preferably a commercially-rolled form whose central portion in cross-section is made somewhat thicker than the legs, whereby the extra material so added tends to materially strengthen the structure. Bulbs may also be provided on the legs and the central portion of the member thickened or made of uniform thickness, as shown in the modified forms. In addition to this another object is to spread the legs slightly at the center of the beam, so as to increase its strength in a vertical direction when the beam is in position under a car. The spreading of the legs at the center of the beam does not materially lessen the resisting powers of the compression member when subjected to the usual strains and the load is applied through the strut or post; but the flaring legs add materially to the strength of the beam in resisting loads on the compression member applied in a vertical direction. Increasing the strength of the beam so as to resist vertically-applied loads is required in the specifications of some railroads, and incidentally it will be noticed that by so increasing the strength of the beam at this point to resist vertically-applied loads the torsional resistance of the beam is likewise increased. This latter or torsional strain is the result of an unequal wearing of the brake-shoes and other causes well known in practice.

It will be observed from an inspection of Figs. 4, 5, and 6 that all of the forms of the compression member there illustrated are well adapted to meet the demands above set forth.

In the drawings, 1 indicates the compression member; 2, the brake-heads fitted on the ends thereof; 3, the filler-blocks fitting within the ends of the channel and provided with openings for the passage of the tension-rod 4.

5 indicates nuts at the ends of the tension-rod for tightening the same and placing a camber in the compression member.

6 is a strut or brake-lever post whose outer end is provided with a seat for the tension-rod and in whose inner end is formed an eye, so constructed as to take in the U-shaped compression member, which is flared at this point. This eye is provided with an internal lug 7, fitting between the legs of the compression member for spacing and holding said legs apart, while a wedge or key is driven down through an opening adjacent the eye, so as to bear against the legs and hold the strut in position against accidental displacement.

By referring to Fig. 4 it will be noted that the compression member 1 is thickened at its middle portion, the increased amount of metal materially strengthening the legs of said member and also affording an extended area at the end of the compression member where it is seated in the brake-head or thrust-block, as the case may be. While I have shown the compression member seated directly in the brake-head, it is obvious that said compression member can fit in the ends of a thrust-block, such as shown in the Huntoon patent, No. 769,384, dated September 6, 1904. This compression member has its legs spread apart at the center of the beam, so as to increase the resisting powers of the compression member against vertically-applied loads, and this flaring materially strengthens the compression member against torsional or twisting strains.

In Fig. 5 the compression member has bulbs 1ª formed on its legs, which not only increases the seating area of the compression member in the thrust-block, but also adds to the strength of the compression member against buckling tendencies.

In Fig. 6 the compression member is formed with an increased central portion and bulbs on its legs, this figure illustrating a cross-section practically combining the advantages of the distribution of the metal shown in Figs. 4 and 5.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. In a brake-beam, the combination with a U-shaped compression member having substantially straight flaring legs which are tapered thickest at their base portions, a tension member, and a strut; substantially as described.

2. In a brake-beam, the combination with a strut and a tension member, a U-shaped compression member whose central portion is thicker than the legs thereof; substantially as described.

3. In a brake-beam, the combination with a strut and a tension member, of a U-shaped compression member having substantially straight flaring legs with bulbs at the edges thereof; substantially as described.

4. In a brake-beam, the combination with a strut and a tension member, of a U-shaped compression member having substantially straight flaring legs, the middle portion of said compression member being thickened and the edges of said legs being provided with bulbs; substantially as described.

5. In a brake-beam, the combination with a strut and a tension member, a U-shaped compression member of uniform cross-section throughout and whose legs occupy a greater angular relation to each other at the middle of the beam than at the ends thereof; substantially as described.

6. In a brake-beam, the combination with a strut and a tension member, of a U-shaped compression member of commercially-rolled material, the legs of said compression member being flared in the plane of the strut to increase the strength of the beam in the resistance of vertically-applied loads or torsional strains; substantially as described.

7. In a brake-beam, the combination with a tension member and a strut, of a cambered, U-shaped compression member whose middle portion is of a thickness different from that of the legs which extend therefrom, and means for maintaining the camber in said compression member; substantially as described.

In testimony whereof I hereunto affix my signature, in the presence of two witnesses, this 2d day of December, 1904.

FREDERICK R. CORNWALL.

Witnesses:
LENORE WILSON,
GEORGE BAKEWELL.